United States Patent
El-Shennawy et al.

(10) Patent No.: US 11,525,716 B2
(45) Date of Patent: Dec. 13, 2022

(54) INDUCTIVE ANGULAR SENSOR METHOD AND SYSTEM

(71) Applicant: Melexis Technologies SA, Bevaix (CH)

(72) Inventors: Mohammed El-Shennawy, Dresden (DE); Paul Jordan, Dresden (DE); Yassine Akermi, Dresden (DE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 17/544,218

(22) Filed: Dec. 7, 2021

(65) Prior Publication Data

US 2022/0260357 A1 Aug. 18, 2022

(30) Foreign Application Priority Data

Feb. 17, 2021 (EP) ..................................... 21157650

(51) Int. Cl.
*G01D 18/00* (2006.01)
*G01D 5/20* (2006.01)
*G01D 5/244* (2006.01)

(52) U.S. Cl.
CPC ......... *G01D 18/001* (2021.05); *G01D 5/2053* (2013.01); *G01D 5/24471* (2013.01)

(58) Field of Classification Search
CPC .... G01D 18/00; G01D 18/001; G01D 18/002; G01D 18/004; G01D 18/006; G01D 18/008; G01D 5/204; G01D 5/2053; G01D 5/2073

See application file for complete search history.

(56) References Cited

U.S. PATENT DOCUMENTS

| | | | | |
|---|---|---|---|---|
| 5,489,845 | A | * 2/1996 | Weber | G05B 19/231 324/207.16 |
| 10,907,992 | B2 | 2/2021 | Utermoehlen et al. | |
| 2006/0076480 | A1 | * 4/2006 | Kiriyama | G01D 18/001 250/231.16 |
| 2014/0035564 | A1 | 2/2014 | Lee et al. | |
| 2019/0025088 | A1 | 1/2019 | Utermoehlen et al. | |
| 2020/0116532 | A1 | * 4/2020 | Janisch | G01D 3/036 |
| 2020/0200569 | A1 | 6/2020 | Utermoehlen et al. | |

FOREIGN PATENT DOCUMENTS

| | | |
|---|---|---|
| DE | 102016202867 B3 | 4/2017 |
| DE | 102017210655 A1 | 12/2018 |
| DE | 102018213411 A1 | 2/2020 |

OTHER PUBLICATIONS

Extended Search Report from corresponding EP Application No. 21157650.9, dated Jul. 22, 2021.

* cited by examiner

*Primary Examiner* — Steven L Yeninas
(74) *Attorney, Agent, or Firm* — Workman Nydegger

(57) ABSTRACT

A method of determining a set of calibration values for offset-compensation of an inductive angular sensor arrangement includes: a substrate with a transmitter coil and three receiver coils, and a rotatable target. The method involves the steps of: a) exciting the transmitter coil; b) positioning the target at or near predefined positions, c) measuring and processing the signals, including calculating sums of squares of difference signals. A sensor device, and an angular sensor system may be arranged or adapted in view of the method.

15 Claims, 15 Drawing Sheets

$$\begin{cases} \text{In0} = \frac{1}{\sqrt{3}} A_{rotor} \sin\left(\emptyset - \frac{1}{6}\pi\right) + A_{common} \\ \text{In1} = \frac{1}{\sqrt{3}} A_{rotor} \sin\left(\emptyset - \frac{5}{6}\pi\right) + A_{common} \\ \text{In2} = \frac{1}{\sqrt{3}} A_{rotor} \sin\left(\emptyset - \frac{9}{6}\pi\right) + A_{common} \end{cases}$$

$$\begin{cases} \text{In}0 = \dfrac{1}{\sqrt{3}} A_{rotor}\, sin\left(\emptyset - \dfrac{1}{6}\pi\right) + A_{common} + A_{asym0} \\ \text{In}1 = \dfrac{1}{\sqrt{3}} A_{rotor}\, sin\left(\emptyset - \dfrac{5}{6}\pi\right) + A_{common} + A_{asym1} \\ \text{In}2 = \dfrac{1}{\sqrt{3}} A_{rotor}\, sin\left(\emptyset - \dfrac{9}{6}\pi\right) + A_{common} + A_{asym2} \end{cases}$$

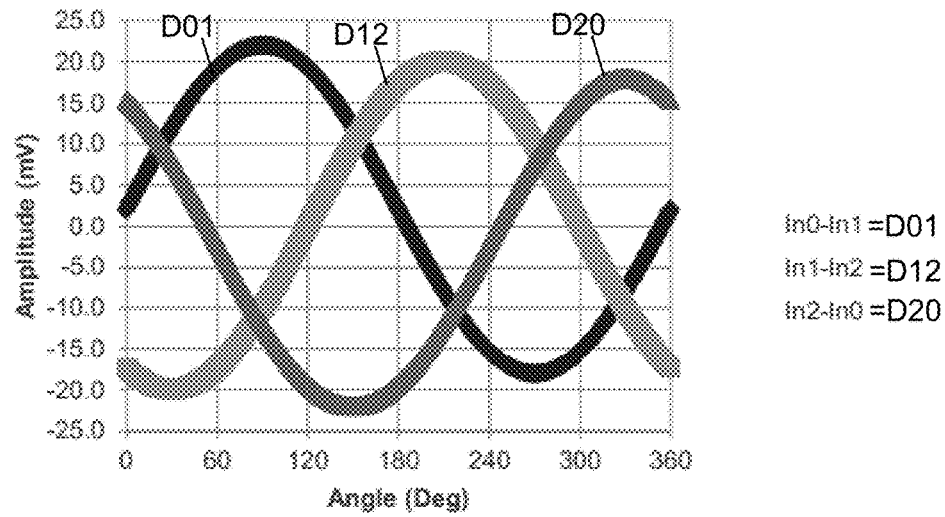

FIG 7(a)

$$\begin{cases} D01a = \text{In0-In1} = \frac{1}{\sqrt{3}} A_{rotor} \left[ \sin\left(\emptyset - \frac{1}{6}\pi\right) - \sin\left(\emptyset - \frac{5}{6}\pi\right) \right] + A_{asym0} - A_{asym1} \\ D12a = \text{In1-In2} = \frac{1}{\sqrt{3}} A_{rotor} \left[ \sin\left(\emptyset - \frac{5}{6}\pi\right) - \sin\left(\emptyset - \frac{9}{6}\pi\right) \right] + A_{asym1} - A_{asym2} \\ D20a = \text{In2-In0} = \frac{1}{\sqrt{3}} A_{rotor} \left[ \sin\left(\emptyset - \frac{9}{6}\pi\right) - \sin\left(\emptyset - \frac{1}{6}\pi\right) \right] + A_{asym2} - A_{asym0} \end{cases}$$

To Be Determined

FIG 7(b)

$$\begin{cases} D01 = D01a - Aasym0 + Aasym1 \\ D12 = D12a - Aasym1 + Aasym2 \\ D20 = D20a - Aasym2 + Aasym0 \end{cases}$$

FIG 8(a)

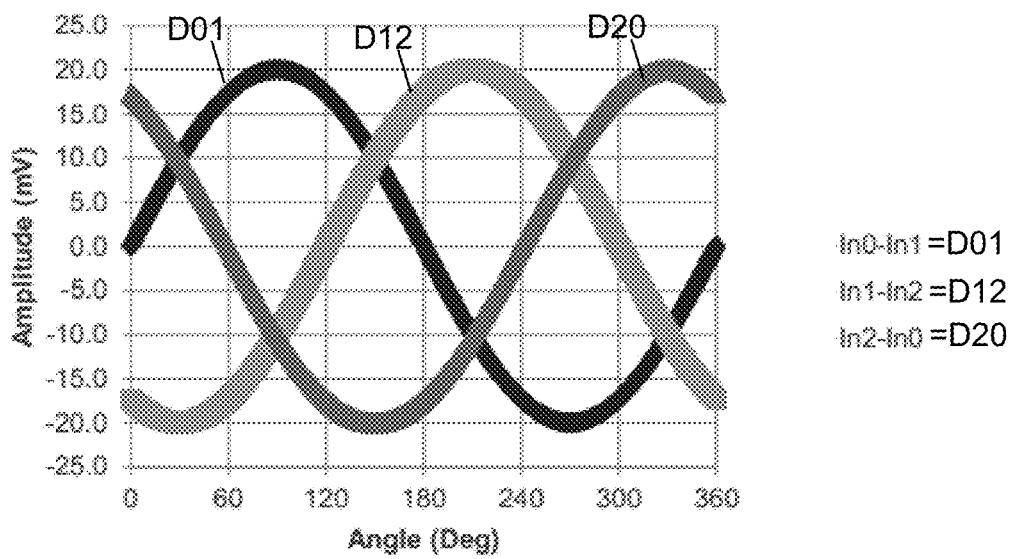

$$\begin{cases} D01 = \frac{1}{\sqrt{3}} A_{rotor} \left[ sin\left(\emptyset - \frac{1}{6}\pi\right) - sin\left(\emptyset - \frac{5}{6}\pi\right) \right] \\ D12 = \frac{1}{\sqrt{3}} A_{rotor} \left[ sin\left(\emptyset - \frac{5}{6}\pi\right) - sin\left(\emptyset - \frac{9}{6}\pi\right) \right] \\ D20 = \frac{1}{\sqrt{3}} A_{rotor} \left[ sin\left(\emptyset - \frac{9}{6}\pi\right) - sin\left(\emptyset - \frac{1}{6}\pi\right) \right] \end{cases}$$

$$SoS = D01a^2 + D12a^2 + D20a^2 =$$

$$\frac{A_{rotor}^2}{3}\underbrace{\left\{\left[\frac{1}{\sqrt{3}}A_{rotor}\left[\sin\left(\phi-\frac{1}{6}\pi\right)-\sin\left(\phi-\frac{5}{6}\pi\right)\right]+A_{asym1}\right]^2 + \left[\frac{1}{\sqrt{3}}A_{rotor}\left[\sin\left(\phi-\frac{5}{6}\pi\right)-\sin\left(\phi-\frac{9}{6}\pi\right)\right]+A_{asym2}\right]^2 + \left[\frac{1}{\sqrt{3}}A_{rotor}\left[\sin\left(\phi-\frac{9}{6}\pi\right)-\sin\left(\phi-\frac{1}{6}\pi\right)\right]+A_{asym0}\right]^2\right\}}_{\text{Term1}}$$

$$+ \frac{2A_{rotor}}{\sqrt{3}}\underbrace{\left\{\left[\sin\left(\phi-\frac{1}{6}\pi\right)-\sin\left(\phi-\frac{5}{6}\pi\right)\right]A_{asym01} + \left[\sin\left(\phi-\frac{5}{6}\pi\right)-\sin\left(\phi-\frac{9}{6}\pi\right)\right]A_{asym12} + \left[\sin\left(\phi-\frac{9}{6}\pi\right)-\sin\left(\phi-\frac{1}{6}\pi\right)\right]A_{asym20}\right\}}_{\text{Term2}}$$

$$+ \underbrace{\left\{A_{asym01}^2 + A_{asym12}^2 + A_{asym20}^2\right\}}_{\text{Term3}}$$

where:

$A_{asym01} = A_{asym0} - A_{asym1}$
$A_{asym12} = A_{asym1} - A_{asym2}$
$A_{asym20} = A_{asym2} - A_{asym0}$

FIG 9

$$\text{Term1} = \frac{A_{rotor}^2}{3} \left\{ \left[ \sin(\emptyset)\cos\left(\frac{1}{6}\pi\right) - \cos(\emptyset)\sin\left(\frac{1}{6}\pi\right) \right]^2 + \left[ \sin(\emptyset)\cos\left(\frac{5}{6}\pi\right) - \cos(\emptyset)\sin\left(\frac{5}{6}\pi\right) \right]^2 + \left[ \sin(\emptyset)\cos\left(\frac{9}{6}\pi\right) - \cos(\emptyset)\sin\left(\frac{9}{6}\pi\right) \right]^2 + \left[ \sin(\emptyset)\cos\left(\frac{5}{6}\pi\right) - \cos(\emptyset)\sin\left(\frac{5}{6}\pi\right) \right]^2 + \left[ \sin(\emptyset)\cos\left(\frac{9}{6}\pi\right) - \cos(\emptyset)\sin\left(\frac{9}{6}\pi\right) \right]^2 + \left[ \sin(\emptyset)\cos\left(\frac{1}{6}\pi\right) - \cos(\emptyset)\sin\left(\frac{1}{6}\pi\right) \right]^2 \right\}$$

$$= \frac{A_{rotor}^2}{3} \left\{ \left[ \sin(\emptyset)\left(\frac{\sqrt{3}}{2}\right) - \cos(\emptyset)\left(\frac{1}{2}\right) \right]^2 + \left[ \sin(\emptyset)\left(\frac{-\sqrt{3}}{2}\right) - \cos(\emptyset)\left(\frac{1}{2}\right) \right]^2 + \left[ \sin(\emptyset)(0) - \cos(\emptyset)(-1) \right]^2 + \left[ \sin(\emptyset)\left(\sqrt{3}\right) \right]^2 + \left[ \sin(\emptyset)\left(\frac{-\sqrt{3}}{2}\right) - \cos(\emptyset)\left(\frac{1}{2}\right) \right]^2 + \left[ \cos(\emptyset)\left(\frac{\sqrt{3}}{2}\right) \right]^2 \right\}$$

$$= \frac{A_{rotor}^2}{3} \left\{ 3\sin^2(\emptyset) + \frac{3}{4}\sin^2(\emptyset) + \frac{9}{4}\cos^2(\emptyset) + \frac{3\sqrt{3}}{2}\sin(\emptyset)\cos(\emptyset) + \frac{9}{4}\cos^2(\emptyset) - \frac{3\sqrt{3}}{2}\sin(\emptyset)\cos(\emptyset) \right\}$$

$$= \frac{A_{rotor}^2}{3} \left\{ \frac{9}{2}\sin^2(\emptyset) + \frac{9}{2}\cos^2(\emptyset) \right\} = \frac{3A_{rotor}^2}{2}$$

FIG 10

$$SoS = \frac{3A_{rotor}^2}{2} + \frac{2A_{rotor}}{\sqrt{3}} \left\{ \begin{array}{l} \left[\sin\left(\emptyset - \frac{1}{6}\pi\right) - \sin\left(\emptyset - \frac{5}{6}\pi\right)\right] A_{asym01} \\ + \left[\sin\left(\emptyset - \frac{5}{6}\pi\right) - \sin\left(\emptyset - \frac{9}{6}\pi\right)\right] A_{asym12} \\ + \left[\sin\left(\emptyset - \frac{9}{6}\pi\right) - \sin\left(\emptyset - \frac{1}{6}\pi\right)\right] A_{asym20} \end{array} \right\} + \left\{ \begin{array}{l} A_{asym01}^2 \\ + A_{asym12}^2 \\ + A_{asym20}^2 \end{array} \right\}$$

Term1 — Term2 — Term3

FIG 11(a)

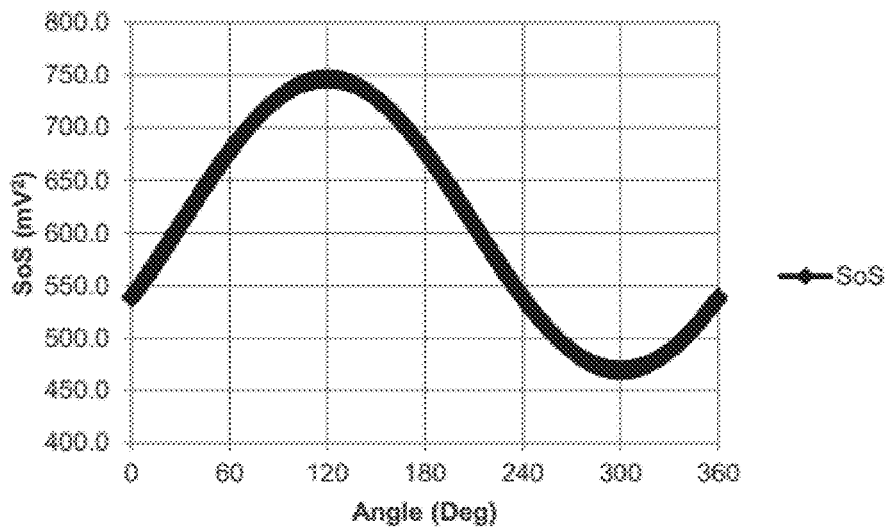

FIG 11(b)

notation: $\left\{ \begin{array}{l} A_{asym01}^2 \\ + A_{asym12}^2 \\ + A_{asym20}^2 \end{array} \right\} = \sum A_{asym}^2$

FIG 11(c)

$\emptyset = 3\pi/6\ (90°)$:

$$SoS_{90} = \frac{3A_{rotor}^2}{2} + \frac{2A_{rotor}}{\sqrt{3}} \left\{ \begin{array}{l} \left[ \sin\left(\frac{3}{6}\pi\right) - \sin\left(\frac{3}{6}\pi - \frac{1}{6}\pi\right) - \sin\left(\frac{3}{6}\pi - \frac{5}{6}\pi\right) \right] A_{asym01} \\ + \left[ \sin\left(\frac{3}{6}\pi\right) - \sin\left(\frac{3}{6}\pi - \frac{5}{6}\pi\right) - \sin\left(\frac{3}{6}\pi - \frac{9}{6}\pi\right) \right] A_{asym12} \\ + \left[ \sin\left(\frac{3}{6}\pi\right) - \sin\left(\frac{3}{6}\pi - \frac{9}{6}\pi\right) - \sin\left(\frac{3}{6}\pi - \frac{1}{6}\pi\right) \right] A_{asym20} \end{array} \right\} + \sum A_{asym}^2$$

$$= \frac{3A_{rotor}^2}{2} + \frac{2A_{rotor}}{\sqrt{3}} \left\{ \begin{array}{l} \left[ \sin\left(\frac{2}{6}\pi\right) \right] A_{asym01} \\ + \left[ \sin\left(\frac{2}{6}\pi\right) - \sin\left(\frac{6}{6}\pi\right) \right] A_{asym12} \\ + \left[ \sin\left(\frac{2}{6}\pi\right) - \sin\left(\frac{6}{6}\pi\right) \right] A_{asym20} \end{array} \right\} + \sum A_{asym}^2$$

$$= \frac{3A_{rotor}^2}{2} + \frac{2A_{rotor}}{\sqrt{3}} \left\{ \left[ \left(\frac{\sqrt{3}}{2}\right) \right] A_{asym01} + \left[ \left(\frac{\sqrt{3}}{2}\right) - (0) \right] A_{asym12} + \left[ (0) - \left(\frac{\sqrt{3}}{2}\right) \right] A_{asym20} \right\} + \sum A_{asym}^2$$

$$= \frac{3A_{rotor}^2}{2} + A_{rotor} \left[ 2A_{asym01} - A_{asym12} - A_{asym20} \right] + \sum A_{asym}^2$$

$$\boxed{SoS_{90} = \frac{3A_{rotor}^2}{2} + A_{rotor} \left[ 3A_{asym01} \right] + \sum A_{asym}^2} \quad [12.1]$$

FIG 12

$$SoS_{30} = \frac{3A_{rotor}^2}{2} + A_{rotor}\{-3A_{asym12}\} + \sum A_{asym}^2 \quad [13.1]$$

$$SoS_{90} = \frac{3A_{rotor}^2}{2} + A_{rotor}\{3A_{asym01}\} + \sum A_{asym}^2 \quad [13.2]$$

$$SoS_{150} = \frac{3A_{rotor}^2}{2} + A_{rotor}\{-3A_{asym20}\} + \sum A_{asym}^2 \quad [13.3]$$

$$SoS_{210} = \frac{3A_{rotor}^2}{2} + A_{rotor}\{3A_{asym12}\} + \sum A_{asym}^2 \quad [13.4]$$

$$SoS_{270} = \frac{3A_{rotor}^2}{2} + A_{rotor}\{-3A_{asym01}\} + \sum A_{asym}^2 \quad [13.5]$$

$$SoS_{330} = \frac{3A_{rotor}^2}{2} + A_{rotor}\{3A_{asym20}\} + \sum A_{asym}^2 \quad [13.6]$$

FIG 13

[13.2]-[13.5]:
$$SoS_{90} - SoS_{270} = A_{rotor}\{3A_{asym01}\} - A_{rotor}\{-3A_{asym01}\} = 6A_{rotor}A_{asym01}$$
$$\Rightarrow A_{asym01} = \frac{SoS_{90} - SoS_{270}}{6A_{rotor}} \quad [14.1]$$

[13.4]-[13.1]:
$$SoS_{210} - SoS_{30} = A_{rotor}\{3A_{asym12}\} - A_{rotor}\{-3A_{asym12}\} = 6A_{rotor}A_{asym12}$$
$$\Rightarrow A_{asym12} = \frac{SoS_{210} - SoS_{30}}{6A_{rotor}} \quad [14.2]$$

[13.6]-[13.3]:
$$SoS_{330} - SoS_{150} = A_{rotor}\{3A_{asym20}\} - A_{rotor}\{-3A_{asym20}\} = 6A_{rotor}A_{asym20}$$
$$\Rightarrow A_{asym20} = \frac{SoS_{330} - SoS_{150}}{6A_{rotor}} \quad [14.3]$$

FIG 14

FIG 15
$$A_{asym01} = \frac{SoS_{90} - SoS_{270}}{6A_{rotor}} \quad [15.1]$$
$$A_{asym12} = \frac{SoS_{210} - SoS_{30}}{6A_{rotor}} \quad [15.2]$$
$$A_{asym20} = \frac{SoS_{330} - SoS_{150}}{6A_{rotor}} \quad [15.3]$$

INDUCTIVE ANGULAR SENSOR METHOD AND SYSTEM

FIELD OF THE INVENTION

The present invention relates in general to the field of inductive angular position sensor systems, and in particular to a method of determining calibration values for offset-compensation of an inductive angular position sensor system.

BACKGROUND OF THE INVENTION

Various inductive angle sensors are known in the art, for example for motor control purposes. They typically comprise an excitation coil (also known as "transmitter coil") and multiple detection coils (also known as "receiver coils"). The transmitter coil and the receiving coils are inductively coupled to one another. The amount of coupling may be influenced by a coupling element (also known as "target") movably mounted in the vicinity of the transmitter and receiver coils. The excitation coil may for example be excited with an AC signal, which induces eddy currents in the target. The receiving coils will generate signals caused by the eddy currents in the target and the current in the transmitting coil. The signals from the receiving coils are analysed in an electronic circuit, and an angular position can be determined based on these signals in known manners.

Different kinds of inductive angle sensors exist. The shape and size and number of coils may vary, as well as the shape and size of the target. They may have different characteristics such as angular range (e.g. 360°, 180°, 120°, etc.), accuracy or measurement error, robustness against axial or radial position offset, compactness, maximum outer radius (also referred to as "turning radius"), component count, component cost, etc.

In order to achieve optimal accuracy, errors or non-idealities need to be compensated for each individual assembly. The error correction algorithm may use a set of parameters which are determined in a calibration procedure performed during the production or assembly stage. These parameters are typically stored in a non-volatile memory of the angular sensor system, so that they can be used during normal operation of the angular sensor device.

US20200116532(A1) describes methods of detecting and correcting errors in a rotating position sensor system having sine and cosine signals.

There is always room for improvements or alternatives.

SUMMARY OF THE INVENTION

It is an object of embodiments of the present invention to provide a method of determining calibration values for offset-compensation of an inductive angular position sensor system.

It is a particular object of embodiments of the present invention to provide a method which is easier to perform, and/or which is less computationally intensive.

It is also an object of embodiments of the present invention to provide a method of offset determination and compensation in an inductive angular position sensor system.

It is also an object of embodiments of the present invention to provide an angular position sensor device comprising at least some of the steps of the method of determining the calibration values, e.g. all of the calculation steps and data capturing steps, but not the mechanical movement of the target, e.g. the mechanical positioning of the target in said predefined positions.

It is also an object of embodiments of the present invention to provide an angular position sensor system comprising such an angular sensor device, configured for performing such a method, except the mechanical movement of the target.

These and other objects are accomplished by a method, an angular position sensor system, and by an angular position sensor device according to embodiments of the present invention.

According to a first aspect, the present invention provides a method of determining a set of calibration values for offset-compensation of an inductive angular sensor arrangement comprising: a substrate and a target; wherein the substrate comprises at least one transmitter coil and three receiver coils for generating three modulated signals from which three baseband signals which are electrically shifted relatively to one another by about 120° can be derived, and wherein the target is rotatable relative to said substrate; the method comprising the steps of: a) applying an alternating signal to the at least one transmitter coil; b) performing at least six times, the steps i) to iv), with i) positioning the target in one of six predefined angular positions (e.g. referred to herein as α30, α90, α150, α210, α270, α330) spaced apart by approximately 50° to 70°; ii) receiving a first, second and third alternating signal from the three receiver coils whilst the target is at or near said predefined angular position; iii) demodulating the first, second and third alternating signal thereby obtaining a first, second and third baseband signal; iv) calculating a first, second and third pairwise difference signal from these baseband signals, and storing (e.g. temporarily storing) these difference signals; c) initializing a first, second and third correction value (e.g. referred to herein as Aasym01, Aasym12, Aasym20); d) adjusting, at least once, the first, second and third pairwise difference signal taking into account the first, second and third correction value, and adjusting at least once the first, second and third correction value based on a sum of squares (e.g. referred to herein as SoS30, SoS90, SoS150, SoS210, SoS270, SoS330) of the adjusted pairwise difference signals.

The three receiver coils and the target have a layout such that they generate three sinusoidal signals which are approximately 120° phase shifted to one another electrically, as the target moves relative to the substrate. Various suitable shapes providing such signals are known in the art. The receiver coils may for example have a circular shape or a shape comprised of two or more circle segments, and the target may have the shape of a flower or a clover with multiple leafs. The leafs or lobes may have straight edges or round edges. Suitable shapes are well known in the art. In a particular case, the receiver coils may have a layout with a rotational symmetry of 120°/N mechanical, where N is an integer value associated with the number of lobes or blades of the target, e.g. equal to or proportional to the periodicity of the target.

In an embodiment, step d) comprises: performing at least once, the steps v) to viii), with v) subtracting the first, second and third correction value from the first, second, third pairwise difference signal respectively, thereby obtaining corrected difference signals; vi) determining a sum of squares (SoS30, SoS90, SoS150, SoS210, SoS270, SoS330) of these corrected difference signals (or values) for each of said six predefined angular positions; vii) estimating an amplitude (e.g. Arotor) of these corrected difference signals; viii) updating the first, second and third correction value (Aasym01, Aasym12, Aasym20) based on the following formulas: Aasym01=(SoS90−SoS270)/(6*Arotor); Aasym12=(SoS210−SoS30)/(6*Arotor); Aasym20=(SoS330−SoS150)/(6*Arotor).

The method may comprise a further step e) of storing the updated first, second and third calibration value (Aasym01, Aasym12, Aasym20) in a non-volatile memory (324).

In an embodiment, step i) comprises: positioning the target at an angular position) $\theta_0+(k*60°+\epsilon[k]$, where $\theta_0$ is a value in the range from 20° to 40°, or from 25° to 35°, e.g. equal to 30°, k is an integer value from 0 to 5, and $\epsilon[k]$ is a random value in the range from −5° to +5°, or in the range from −3° to +3°, which may be different for each value of k. Ideally, $\epsilon[k]$ is equal to 0°, but that is not absolutely required.

Step c) may comprise: initialize the values to zero, but that is not absolutely required. The algorithm will also converge if the initial values are not equal to zero.

In an embodiment, step i) comprises: positioning the target in one of six predefined angular positions (referred to herein as $\alpha30, \alpha90, \alpha150, \alpha210, \alpha270, \alpha330$) spaced apart by 55° to 65°.

In an embodiment, the sum of squares (SoS30, SoS90, SoS150, SoS210, SoS270, SoS330) is calculated in accordance with the following formula: $SoS=(D01)^2+(D12)^2+(D20)^2$, or written as a function of $\theta$: $SoS(\theta)=(D01(\theta))^2+(D12(\theta))^2+(D20(\theta))^2$.

In an embodiment, the value of Arotor is calculated in accordance with the following formula:

$$Arotor=[max(D01)-min(D01)+max(D12)-min(D12)+max(D20)-min(D20)]/6,$$

where max(·) means a maximum value, and min(·) means a minimum value.

It was found that the algorithm is highly insensitive to inaccuracies of the estimates of Arotor. It is noted in particular that a value of Arotor based on only six samples per period, spaced apart by approximately 60° as recited above, is sufficient. But of course, a value of Arotor based on more than six samples per period may also be used.

In an embodiment, step viii) further comprises: determining how much the correction values have changed in this iteration of step d) (compared to the values of the previous iteration), and comparing this change to a predefined threshold value; and if the change is larger than the threshold value, performing another iteration of step d); and if the change is smaller than the threshold value, continuing with step e).

It was found that the algorithm typically converges after 3 or 4 iterations of step d). However, in some cases, it may converge sooner. The comparison of how much the correction values have changed can be performed in any known way, e.g. using a sum of absolute differences, or a sum of squares of the differences, or considering a maximum variation of the three values, or any other suitable distance function.

In an embodiment, step d) is performed a predefined number (N) of times. The value of N is preferably a value in the range from 1 to 10, or from 1 to 5, for example equal to 2 or 3 or 4 or 5.

In an embodiment, step i) comprises: positioning the target in a stationary position; and step ii) comprises: receiving said alternating signals from the receiver coils whilst the target is in said predefined angular position.

This embodiment is referred to as the "static measurement". In this embodiment, preferably the values determined in step iv) are temporarily stored, so that the same values can be used and re-used for multiple iterations of step d).

In an embodiment, step i) comprises: allowing or causing the target to rotate (e.g. at a substantially constant speed); and step ii) comprises: receiving said alternating signals (S0, S1, S2) from the receiver coils whilst the target is in the vicinity of said predefined angular position (e.g. at said angular position +/−5°, or +/−3°).

This embodiment is referred to as the "dynamic measurement". In this embodiment, the values determined in step iv) may be stored, but that is not absolutely required, and the target may continue to run during multiple iterations of step d).

In an embodiment, the substrate is a printed circuit board, and the at least one transmitter coil and the three receiver coils are formed by conductive tracks on the printed circuit board.

In an embodiment, the at least one transmitter coil is substantially circular.

In an embodiment the at least one transmitter coil is part of an LC oscillator circuit.

In an embodiment, the receiver coils are anti-winded. One could also say that the receiver coils are "zero-flux coils". It is noted, however, that the present invention also works if the receiver coils are not "anti-winded" or are not "zero-flux coils".

The target may comprise from 1 to 25 lobes, or from 2 to 24 lobes, or from 4 to 12 lobes. In preferred embodiments, the target comprises from 4 to 8 lobes.

In an embodiment, the at least one transmission coil has a circular shape; and the target comprises a plurality of lobes which are equidistantly spaced apart over a full circle.

In an embodiment, the at least one transmission coil has a C-shape with an outer radius and an inner radius; and the target comprises a plurality of lobes which are equidistantly spaced apart over a circular arc segment.

In an embodiment, the target comprises a printed circuit board, and a plurality of conductive zones, e.g. copper zones.

In an embodiment, the target is made of metal.

In an embodiment, the transmitter coil is excited with an alternating signal having a frequency in the range from 1 to 20 MHz.

According to a second aspect, the present invention also provides a method of offset determination and compensation in an inductive angular position sensor system, wherein the substrate comprises at least one transmitter coil and three receiver coils for generating three modulated signals from which three baseband signals which are electrically shifted relatively to one another by about 120° can be derived, and wherein the target is rotatable relative to said substrate; and wherein the position sensor system further comprises an angular sensor device and a non-volatile memory; the method comprising the steps of: x) determining a plurality of calibration values (e.g. Aasym01, Aasym12, Aasym20) using a method according to the first aspect; y) storing these calibration values in the non-volatile memory of the angular sensor device during a calibration phase; z) reading these calibration values from said non-volatile memory, and using them for offset-compensation during normal use of said angular sensor device.

According to a third aspect, the present invention also provides an angular sensor device comprising: a demodulator circuit configured for demodulating three modulated signals to three baseband signals; a non-volatile memory for storing at least three calibration values (e.g. Aasym01, Aasym12, Aasym20); a processing circuit connected to an output of said demodulator circuit, and connected to said non-volatile memory, and configured for performing at least the steps ii) to iv) and c) to d) of a method according to the first aspect.

It is noted that step a) may but does not necessarily have to be performed by the same angular position sensor device, but could also be performed by another device.

The angular sensor device may be mounted on the same substrate (e.g. on the same PCB) as the substrate that contains the transmitter coil(s) and receiver coils.

According to a fourth aspect, the present invention also provides an angular sensor system comprising: a substrate comprising at least one transmitter coil and three receiver coils configured for generating three modulated signals from which three baseband signals which are electrically shifted relatively to one another by 120° can be derived; a target rotatable relative to said substrate; an angular sensor device according to the third aspect, connected to said at least one transmitter coil and to said receiver coils.

In an embodiment, the substrate has a rotational symmetry of 120° divided by the number N of lobes of the target.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 7(a) shows a graph showing three pairwise differences between the baseband signals of FIG. 6(a).

FIG. 7(b) shows a set of three equations representing them.

FIG. 8(a) shows a set of formulas of how the calculate the corrected difference signals.

FIG. 8(b) shows what the corrected pairwise difference waveforms should ideally look like.

FIG. 8(c) shows a set of three equations representing them.

FIG. 9 shows a formula defined as the sum of squares "SoS" of the difference waveforms, which can be written as a sum of three terms.

FIG. 10 shows that the first term can be simplified and is only dependent on Arotor.

FIG. 11(a) shows the formula of FIG. 9, with the simplified expression for the first term.

FIG. 11(b) shows an exemplary graph illustrating the sum of squares of a particular example.

FIG. 11(c) shows another notation of the third term.

FIG. 12 shows an evaluation of the sum of squares for a particular angle, namely for θ=π/2=90°, referred to herein as SoS90.

FIG. 13 shows the evaluation of the sum of squares for six particular angles, spaced apart by 60°, referred to herein as SoS30, SoS90, . . . , SoS330.

FIG. 14 shows formulas for three pairwise differences between sum of squares.

FIG. 15 shows three extremely simple formulas to calculate each of the offsets of the three baseband signals as a linear combination of two sum of squares.

Figure 1:
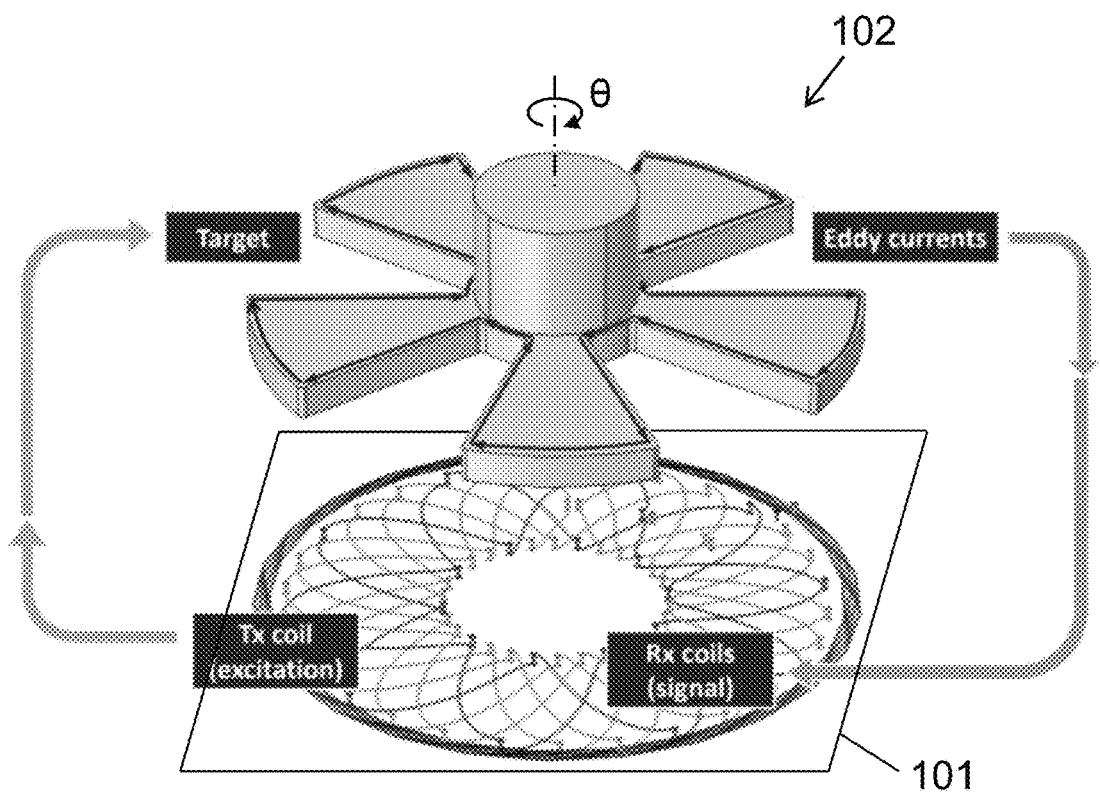
FIG. 1 shows an example of an arrangement comprising: a substrate comprising a transmitter coil and receiver coils; and a target (having five blades) movable relative to said substrate, as can be used in embodiments of the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When in the present invention reference is made to "sum of squares", reference is made to formula [9.1] of FIG. 9.

Figure 17:
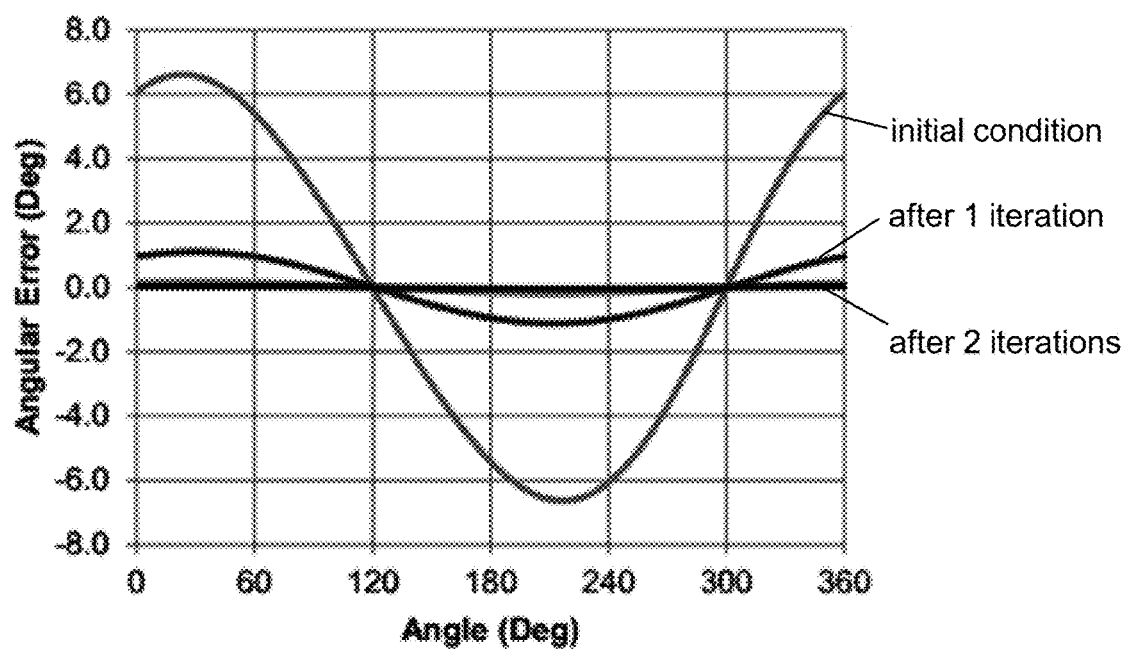
FIG. 17 shows a plot with three curves, representing the angular error without offset compensation, or when compensating using the values obtained after 1 iteration, or when compensating using the values obtained after 2 iterations.

In this document, the expression "offset compensation" means compensating for non-idealities, for example due to geometrical tolerances of PCB traces, geometrical asymmetries in the PCB feeding traces to the coils, asymmetries in the environment surrounding the angle sensor, etc. Without compensation, such non-idealities typically lead to DC offsets of the baseband signals (hence the name "offset-compensation"), which in turn typically lead to angular errors (e.g. as illustrated in FIG. 17).

In this document, the expression "correction value" or "calibration value" are used as synonyms, and typically refer to the values Aasym01, Aasym12, Aasym20, unless explicitly mentioned otherwise.

The present invention relates in general to inductive angular position sensor systems. As mentioned above, they typically comprise a substrate with a (or at least one) an excitation coil (also known as "transmitter coil") and a plurality of detection coils (also known as "receiver coils"), which are inductively coupled. The amount of coupling may be influenced by a coupling element (also known as "target") mounted in the vicinity of the transmitter and receiver coils. The excitation coil is typically excited with an AC signal, which induces eddy currents in the target. The receiving coils will generate signals (e.g. voltage signals) caused by the eddy currents in the target and by the current in the transmitting coil. The signals from the receiving coils are analysed in an electronic circuit, and an angular position can be determined based on these signals. More specifically, the present invention is related to an inductive angular sensor system having three receiver coils providing three modulated signals, from which three baseband signals can be derived which are 120° shifted electrically.

FIG. 1 shows a first example of such an inductive sensor arrangement comprising: a substrate (e.g. a printed circuit board, PCB) comprising a transmitter coil and receiver coils; and a target (e.g. a metal target) rotatable relative to said substrate. In the example shown, the transmitter coil(s) describe a full circle (also referred to as an O-shape), but the present invention is not limited thereto, and also works for so called "C-shaped" coils. In the example shown, the target has five lobes (or leaves or blades) which are spaced apart by 360°/5=72°, but the present invention is not limited thereto either, and also works for targets having a different number of lobes, for example from 1 to 25 lobes, or from 2 to 22 lobes.

Figure 2:
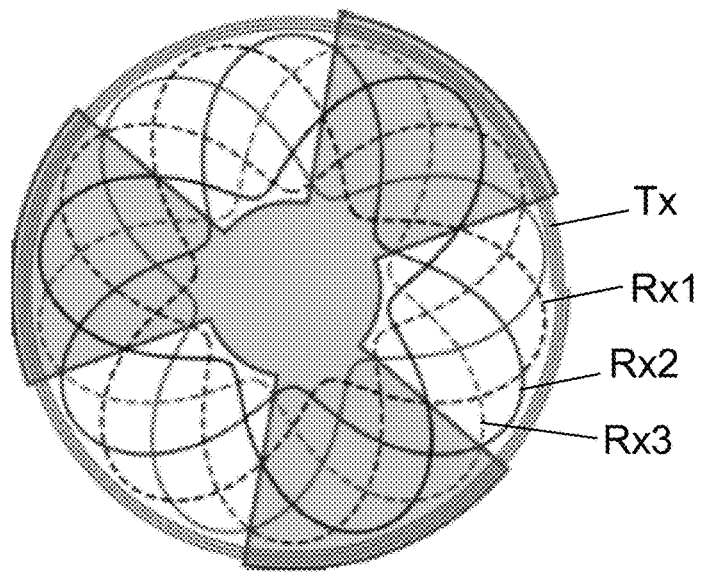
FIG. 2 shows a variant of the arrangement of FIG. 1 for a target having only three blades, as can be used in embodiments of the present invention.

FIG. 2 shows another example of an inductive sensor arrangement having an O-shape. In this example, the target has only three blades. In embodiments of the present invention, the shape and size of the transmitter coil TX, and the shape and size of the three receiver coils Rx1, Rx2, Rx3, and the shape and size of the target blades may vary, as long as the sensor arrangement provides three modulated signals from which three baseband signals can be derived which are substantially 120° phase shifted electrically. Suitable shapes are well known in the art, and is not the main focus of the present invention.

Figure 3:
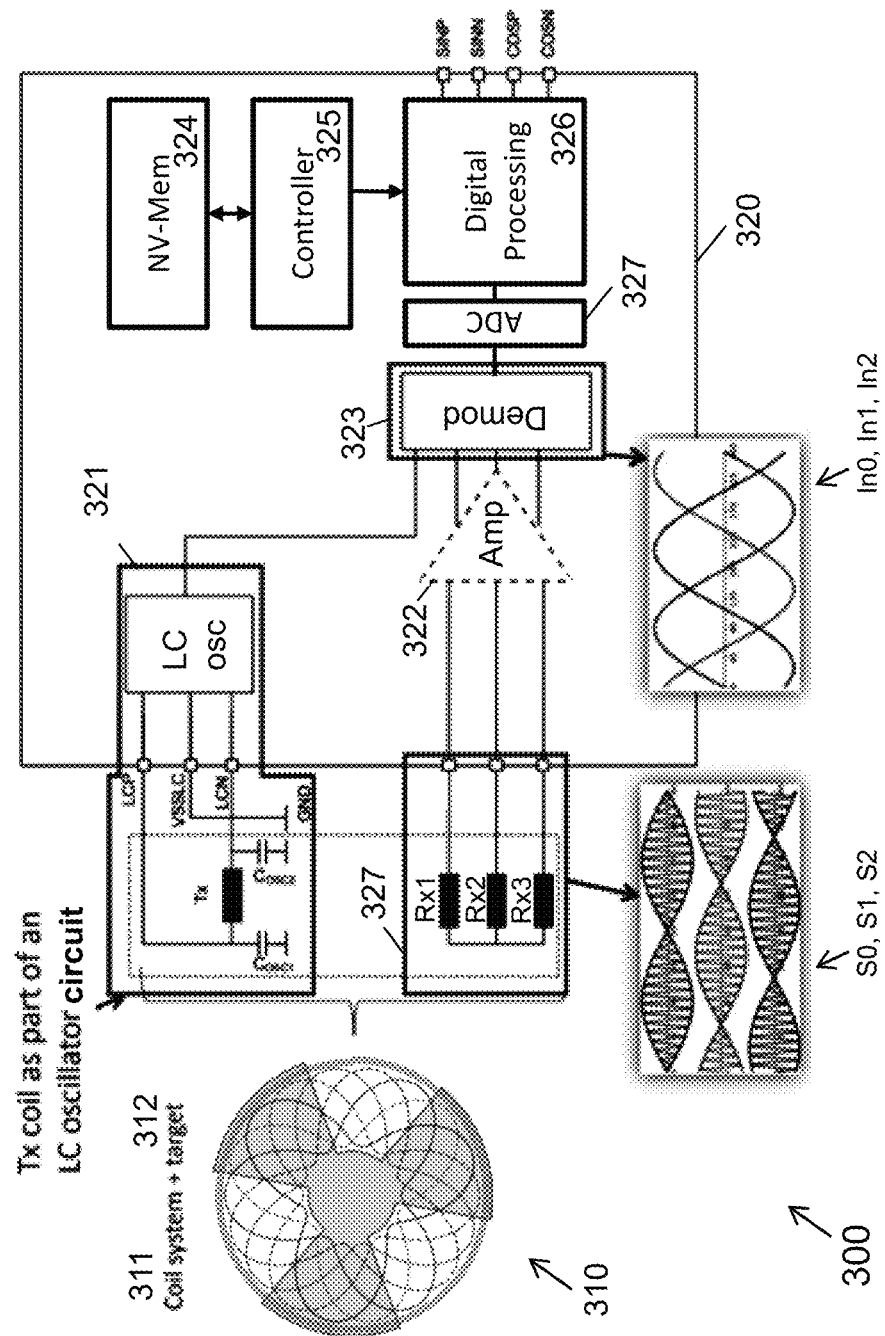
FIG. 3 shows a schematic block-diagram of an angular sensor system according to embodiments of the present invention, comprising: a substrate with at least one transmitter coil and three receiver coils, a target movable relative to said substrate, and an angular sensor device connected to said receiver coils.

FIG. 3 shows a schematic block-diagram of an angular sensor system 300, comprising: an inductive sensor arrangement 310 comprising: a substrate with at least one transmitter coil TX and three receiver coils Rx1, Rx2, Rx3, and a target which is rotatable relative to said substrate.

The sensor system 300 further comprises a sensor device 320 connected at least to said receiver coils Rx1, Rx2, Rx3 for receiving and processing the received signals. The sensor device 320 is preferably also connected to the transmitter coil TX and is preferably further configured for exciting the transmitter coil with an AC signal.

The sensor system 300 may have an oscillator circuit 321, and the transmitter coil TX may be part of that oscillator circuit, but this is not absolutely required, and the excitation may also be performed by a separate circuit, e.g. by a separate chip. The transmitter coil may be excited at a frequency of about 1 MHz to about 20 MHz. The excitation frequency may be higher than, or lower than, or substantially equal to the resonance frequency of the oscillator circuit. These aspects are well known in the art, but are not the main focus of the present invention, and hence need not be explained in more detail here.

The sensor device 320 is configured for receiving signals from the receiver coils Rx1, Rx2, Rx3, and optionally for amplifying these signals using amplifier 322, and for demodulating these signals in demodulator 323, yielding three baseband signals In0, In1, In2. The demodulation may comprise synchronous rectification and low-pass filtering. These baseband signals are then "offset compensated" using a known algorithm and using a small number of calibration values, which values are stored in a non-volatile memory 324 of the sensor device 320 during a calibration procedure. The angle may be computed from these offset-compensated signals, for example, using the "Clarke transformation" to convert the three-phase signals into quadrature signals, on which an arctangent operation can be performed. In the system shown in FIG. 3, the sensor device 320 may perform the Clarke Transformation, and provides a sine and cosine signal to an external processor, e.g. an ECU (not shown), which can calculate the angle therefrom. In a variant, the angle is calculated inside the sensor device 320, and may be provided to the external processor.

A method of determining these calibration values is known in the prior art, but the current way of determining these calibration values is rather complex and computationally intensive.

The inventors of the present invention had the task to find a simpler and/or more efficient and/or more elegant calibration procedure for determining these calibration values, e.g. a method which is less computationally intensive.

Figure 4:
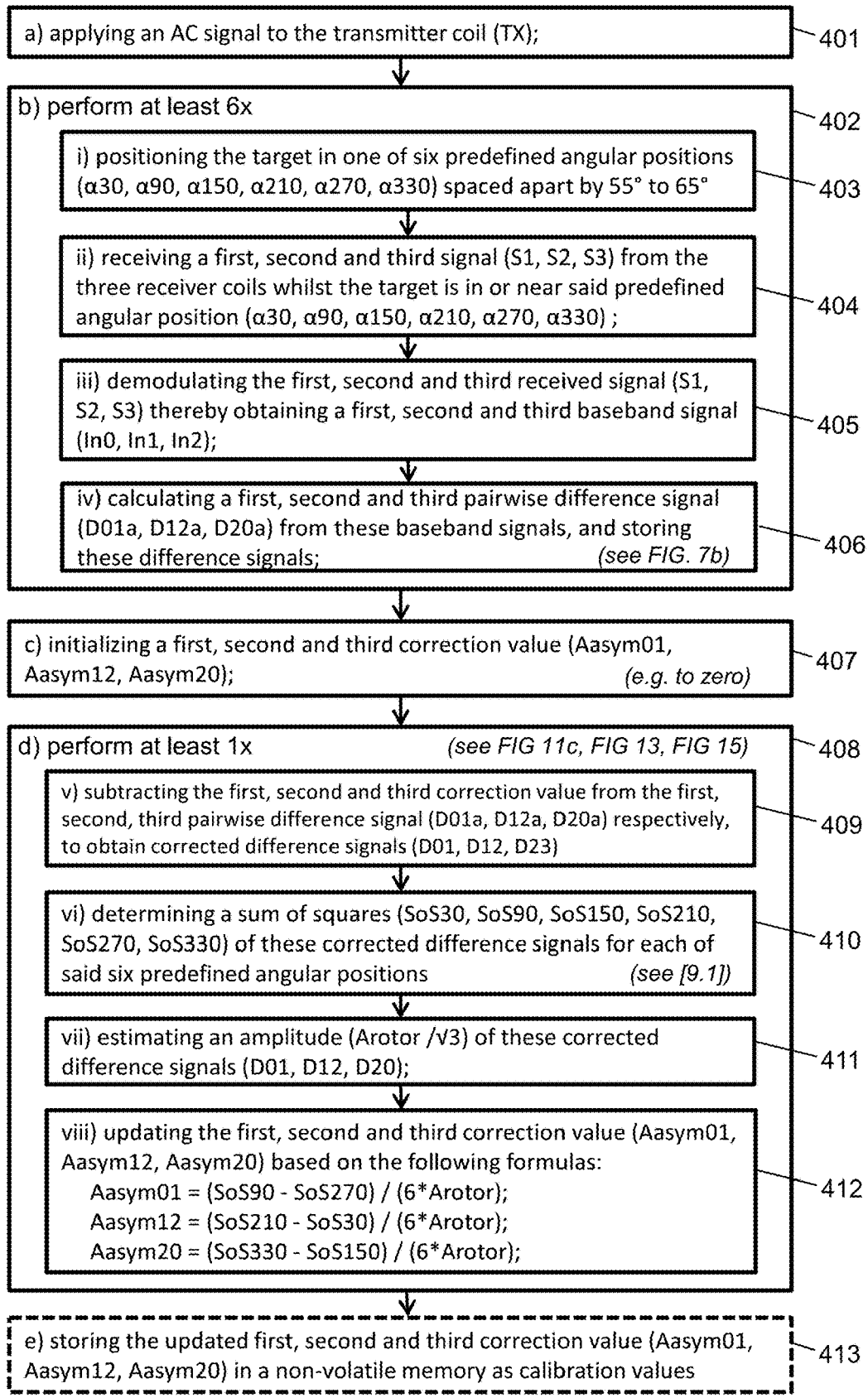
FIG. 4 shows a flow-diagram of a method of determining calibration parameters for offset-compensation, according to an embodiment of the present invention.

FIG. 4 shows a flow-diagram of a method 400 of determining a set of calibration parameters for offset-compensation. The method 400 comprises the following steps:

a) applying (401) an alternating signal to the at least one transmitter coil (TX).
This step may be performed by the sensor device 320 itself, but that is not absolutely required, and the transmitter coil could also be excited by another device.

b) performing (402) at least six times the steps i) to iv):
  i) positioning (403) the target (312) in one of six predefined angular positions ($\alpha 30$, $\alpha 90$, $\alpha 150$, $\alpha 210$, $\alpha 270$, $\alpha 330$) spaced apart by approximately 55° to 65°;
  ii) receiving (404) a first, second and third alternating signal (S0, S1, S2) from the three receiver coils (Rx1, Rx2, Rx3) whilst the target (312) is at said predefined angular position;
  iii) demodulating (405) the first, second and third received signal (S0, S1, S2) thereby obtaining a first, second and third baseband signal (In0, In1, In2);
  iv) determining (406) a first, second and third pairwise difference signal (D01a, D12a, D20a) from these baseband signals (In0, In1, In2), and storing these difference signals;

c) initializing (407) a first, second and third correction value (Aasym01, Aasym12, Aasym20);

d) performing (408) at least once, the steps v) to viii):
  v) subtracting (409) the first, second and third correction value from the first, second, third pairwise difference signal (D01a, D12a, D20a) respectively, thereby obtaining corrected difference signals (D01, D12, D20); e.g. using the formulas shown in FIG. 8(a);
  vi) determining (410) a sum of squares (SoS30, SoS90, SoS150, SoS210, SoS270, SoS330) of the corrected difference signals (D01, D12, D20) for each of said six predefined angular positions ($\alpha 30$, $\alpha 90$, $\alpha 150$, $\alpha 210$, $\alpha 270$, $\alpha 330$);
  vii) estimating (411) an amplitude (Arotor/$\sqrt{3}$) of the corrected difference signals (D01, D12, D20);
  viii) updating (412) the first, second and third correction value (Aasym01, Aasym12, Aasym20) based on the following formulas:

$$\text{Aasym01} = (SoS90 - SoS270)/(6 * \text{Arotor});$$

$$\text{Aasym12} = (SoS210 - SoS30)/(6 * \text{Arotor});$$

$$\text{Aasym20} = (SoS330 - SoS150)/(6 * \text{Arotor});$$

wherein SoS30 to SoS330 are the sum of square values at the predefined angular positions, and wherein (Arotor/$\sqrt{3}$) is the amplitude determined in step vii).

In an embodiment, step iii) may further comprise "digitizing the demodulated signals", and step iv) may comprise: calculating differences. Alternatively, the difference between the demodulated signals may be determined in the analog domain in step iv) using one or more differential amplifiers, and the analog difference signals may be digitized in step iv). In both cases, the difference values are preferably stored as 6×3=18 digital values in step iv), for example in RAM.

The correction values may be initialized to zero in step c), in which case the subtraction in step v) can be omitted for the first iteration, but that is an implementation detail, which may or may not be used.

It is a major advantage of this method that the target needs to be positioned at or near the predefined angular positions only six times, irrespective of the number of iterations of step d).

It is an advantage that this method can be applied to an angular sensor system without having to physically remove the rotor. This requires less handling, but also provides better calibration values.

It is an advantage of this method that it does not require the mounting of a second, highly accurate reference sensor.

It is a major advantage that the data acquisition (in step b) only needs to be performed once, even if multiple post-processing iterations are performed in step d).

The recursive loop (d) can be stopped for example after a predefined number of iterations, or when the offset-values vary less than a certain amount (absolute or relative amount) from those determined in the previous iteration. Typically the algorithm converges in 3 to 4 iterations depending on the amount of initial offset and the accuracy of the Arotor-estimate.

Step b) is intended to gather a measurement for the target being in each of said six predefined positions. This can be done in only six steps, if the target is moved in each of the six predefined positions once, in any order, or can be done in multiple steps, e.g. if the target is continuously moving.

The method 400 may further comprise step e) of storing the updated set of correction values Aasym01, Aasym12, Aasym20 in a non-volatile memory as calibration values, in which case the method becomes a method of determining and storing the calibration values.

Figures 5A, 5B:
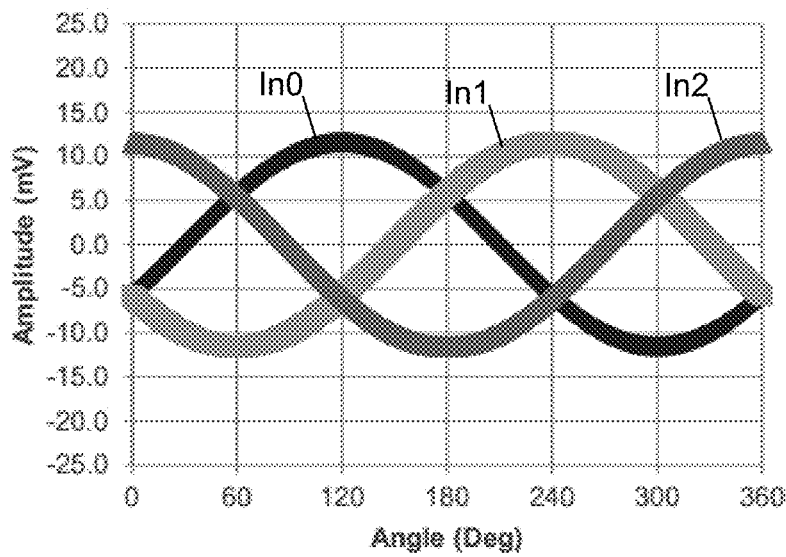
FIG. 5(a) shows a graph with three baseband signals, obtained by demodulating the signals obtained from the receiver coils, in an ideal situation.
FIG. 5(b) shows a set of three equations representing these waveforms, each having an amplitude Arotor/√3.

FIG. 5(a) shows a graph with three baseband signals In0, In1, In2, as may be obtained by demodulating the signals S0, S1, S2 obtained from the receiver coils Rx1, Rx2, Rx3 in an ideal situation, i.e. without any offset. The values on the vertical axis are arbitrary values.

FIG. 5(b) shows a set of three equations representing these ideal waveforms, each having an amplitude Arotor/$\sqrt{3}$, and a common DC-offset Acommon, and the signals being 120° phase shifted electrically with respect to each other. The angle θ represents the angular position of the target relative to the substrate. In the example shown in FIG. 5(a), the value of Acommon is equal to zero, due to the use of anti-winded receiver coils, but that is not absolutely required for the invention to work.

Figures 6A, 6B:
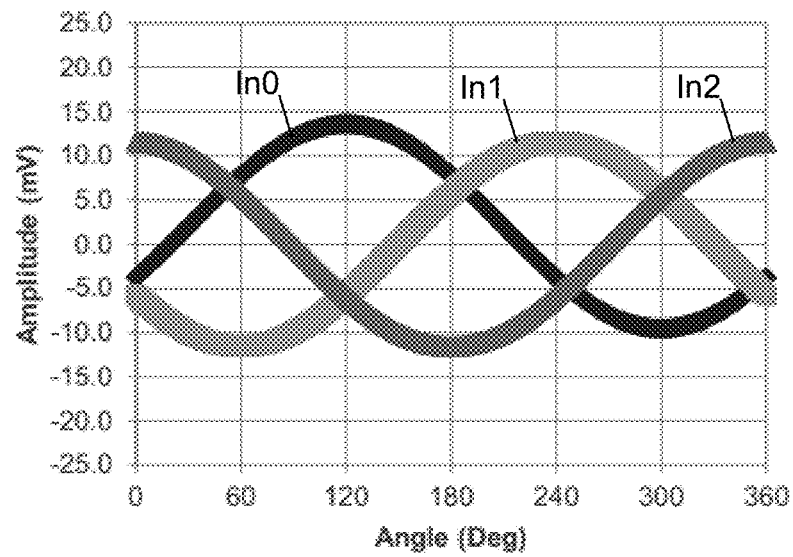
FIG. 6(a) shows a graph with three baseband signals, obtained by demodulating the signals obtained from the receiver coils, in a practical situation.
FIG. 6(b) shows a set of three equations representing these waveforms, each with an individual offset value.

FIG. 6(a) shows a graph with three baseband signals In0, In1, In2, as may be obtained by demodulating the signals S0, S1, S2 obtained from the receiver coils Rx1, Rx2, Rx3 in a practical situation. In the illustrative example shown in FIG. 6(a), Aasym0 was chosen equal to Arotor*0.1, but of course, this is only an example.

FIG. 6(b) shows a set of three equations representing these waveforms, each having an amplitude Arotor/√3, and a common DC-offset Acommon, and an individual offset Aasym0, Aasym1, Aasym2, and the signals being 120° phase shifted electrically with respect to each other. The angle θ represents the angular position of the target relative to the substrate.

The above-mentioned problem can then be reformulated as "how to determine the offset values Aasym0, Aasym1, Aasym2".

The value "Acommon" can be eliminated by determining pairwise differences between the three baseband signals In0, In1, In2.

FIG. 7(a) shows a graph showing these pairwise differences, and FIG. 7(b) shows a set of three equations representing them. As can be appreciated from these formulas, each offset value (Aasym0, Aasym1, Aasym2) influences two difference signals.

The offset values can be determined or at least estimated or approximated by applying the method 400 of FIG. 4, which will be discussed further by referring to FIG. 9 to FIG. 17 and stored in the non-volatile memory 324 of the sensor device during a calibration procedure.

After the calibration procedure, e.g. during normal operation of the sensor device, the offset values Aasym0, Aasym1, Aasym2 are stored in the non-volatile memory 324, from which they can be retrieved by the controller 325 and fed to the digital processing circuit 326, where they can be used to compensate the offset, for example in accordance with the formulas shown in FIG. 8(a), which are directly derivable from the set of equations of FIG. 7(b). FIG. 8(b) shows what the offset corrected pairwise difference waveforms typically look like, and FIG. 8(c) shows a set of three equations representing them.

One of the main ideas underlying the present invention is to calculate a sum of squares SoS of the pairwise difference signals D01a, D12a and D20a, as expressed by formula [9.1] of FIG. 9.

After substituting the formulas of FIG. 7(b), this sum of squares "SoS" can be written as a sum of three terms: Term1, Term2 and Term3. The skilled reader will agree that this expression seems quite overwhelming, and that it is not trivial at all how this formula can possibly lead to a simple solution.

The inventors, however, went one step further, and realized that the first term can be simplified, as shown in FIG. 10, to a value equal to $(3/2)*Arotor^2$, which allows the formula of FIG. 9 to be rewritten as shown in FIG. 11(a), which still consists of three terms.

FIG. 11(b) shows an exemplary graph illustrating the sum of squares as a function of the angular position, for a particular inductive sensor system. The inventors found that, ideally (if there no offset), the sum of squares is completely constant, (in this example equal to 600 mV$^2$), but in case there is an offset, the SoS has a particular sinusoidal shape.

FIG. 11(c) shows another notation of the third term.

Figure 11D:
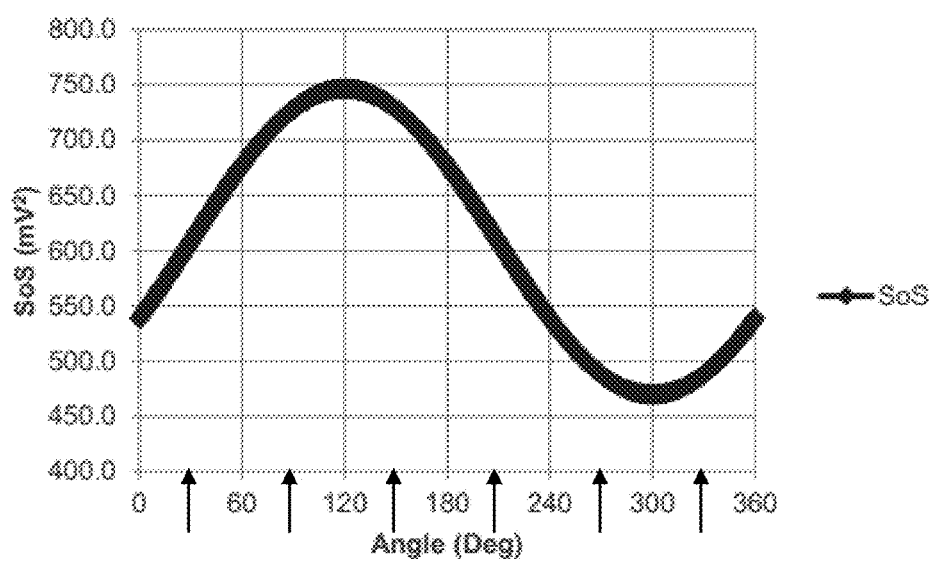
FIG. 11(d) is a copy of FIG. 11(b), with the reference angles added.

As another idea underlying the present invention, the inventors came to the idea of evaluating the sum of squares SoS in six specific locations, as shown in FIG. 11(d), these locations being at 30°, 90°, 150°, 210°, 270° and 330°.

FIG. 12 shows an evaluation of the sum of squares SoS(θ) for θ=π/2=90°, referred to herein as SoS90, which can be written as Formula [12.1].

The sum of squares can also be calculated for θ=30°, θ=150°, θ=210°, θ=270° and θ=330°, in a similar manner, leading to the set of formulas [13.1] to [13.6] of FIG. 13.

The inventors further came to the idea of subtracting SoS90 and SoS270, from which the extremely simple formula [14.1] can be derived, stating that Aasym01=(SoS90−SoS270)/(6*Arotor).

Likewise, subtraction of SoS210 and SoS30 leads to the extremely simple formula [14.2] stating that Aasym12=(SoS210−SoS30)/(6*Arotor).

Likewise, subtraction of SoS330 and SoS150 leads to the extremely simple formula [14.3] stating that Aasym20=(SoS330−SoS150)/(6*Arotor).

These formulas are repeated in FIG. 15, which shows an important conclusion of the present invention. More specifically, FIG. 15 shows three extremely simple formulas, not allowing to calculate the individual offsets (Aasym0, Aasym1, Aasym2) themselves, but allowing to calculate pairwise differences (Aasym01=Aasym0−Aasym1; Aasym12=Aasym1−Aasym2; Aasym20=Aasym2−Aasym0) between these offsets as a linear combination of two sum of squares selected from the six sums of squares mentioned above. Once these values are known, they can be used to calculate the offset compensated signals D01, D12, D20 described in FIG. 8(a).

It is noted that the value of "Arotor" can be estimated from the demodulated signals In0, In1, In2 as half of the peak-to-peak value of each of the three baseband signals (i.e. the maximum minus the minimum divided by two). It is also possible to use a mean or average or median of the three Arotor-estimates from the three baseband signals to improve the accuracy of the Arotor estimate. On the other hand, it was found that the accuracy of the Arotor value is not critical for the final result, and that the algorithm will still converge to the same final calibration coefficients, provided that the Arotor estimate is correct within ±20% of the actual amplitude. However, a more accurate estimate of Arotor may lead to a faster convergence of the offset-values.

Figure 16:
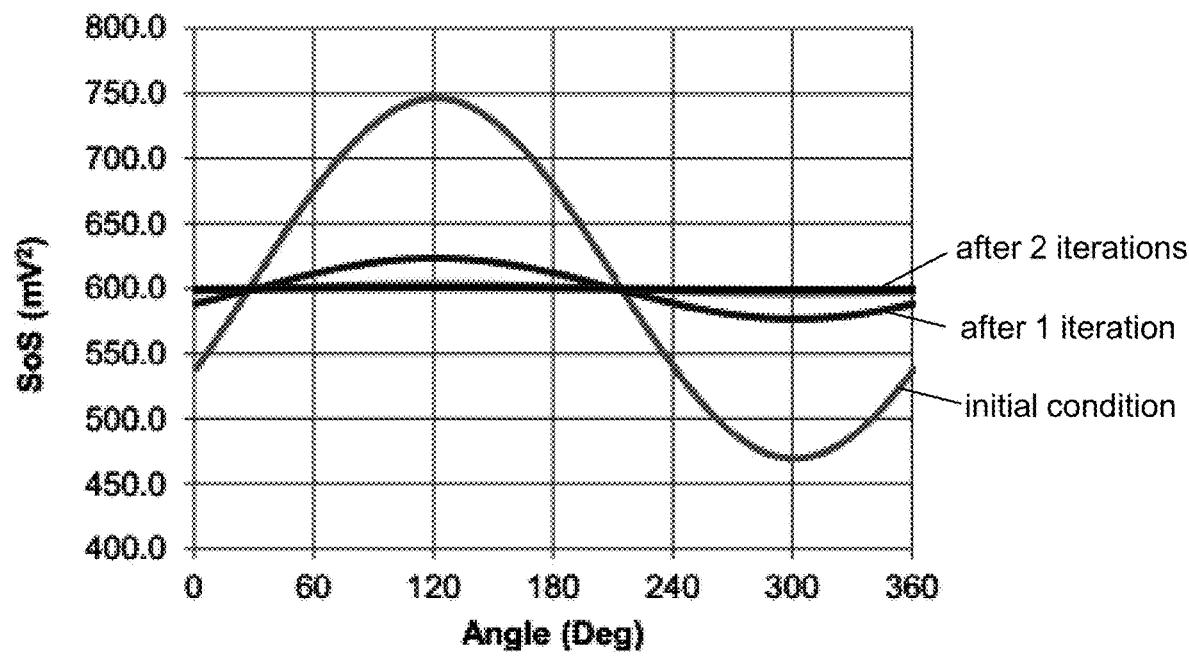
FIG. 16 shows the graph of FIG. 11(b) with a first SoS-curve representing the initial condition from which a first set of offsets can be calculated using the formulas of FIG. 15 and shows a second and third SoS curve representing the sum of squares after a first and a second iteration respectively.

FIG. 16 shows the graph of FIG. 11(b) with a first SoS-curve representing the initial condition from which a first set of offsets can be calculated using the formulas of FIG. 15, and shows a second and third SoS curve representing the sum of squares after a first and a second iteration respectively. As can be seen, the algorithm converges very quickly, and it is often sufficient to stop after 3 to 4 iterations.

FIG. 17 shows a plot with three curves, representing (i) the angular error without offset compensation, (ii) the angular error after compensating using the values obtained after 1 iteration, and (iii) the angular error after compensating using the values obtained after 2 iterations. Again, as can be seen, the algorithm converges very quickly, and can drastically improve the accuracy of the angular sensor system.

Figure 18:
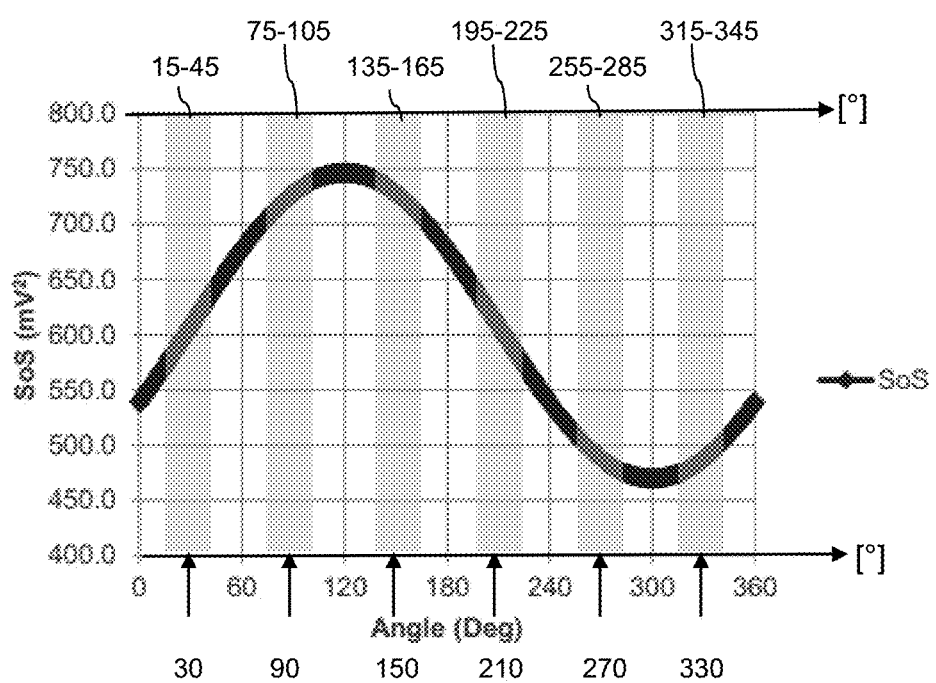
FIG. 18 shows a variant of FIG. 11(d) with grey zones near the reference angles.

While the invention is explained above for sum of square values determined at particular angular positions, namely: 30°, 90°, 150°, 210°, 270°, 330°, the inventors surprisingly found that the exact position is not critical, and the invention will also work for example, if the sum of square values are determined for example at: 20°, 80°, 140°, 200°, 260°, 320°, or at 40°, 100°, 160°, 220°, 280°, 340°, thus the reference values plus a constant angular shift. It was furthermore found that the invention also works if a small random value (e.g. within +/−5° or within +/−3°) is added to each reference position, and that the invention still works if both a constant value and a small random value are cumulatively added. Stated in mathematical terms, this means that the invention still works if the sum of squares is calculated in angular positions expressed by:

$$\theta_0 + (k*60°) + \varepsilon[k]$$

where $\theta_0$ is a value in the range from 20° to 40°, or in the range from 25° to 35°; k is an integer value from 0 to 5; and $\varepsilon[k]$ is a random value in the range from −5° to +5°, or in the range from −3° to +3°, which may be different for each value of k. These ranges are illustrated (in gray) in FIG. 18. Ideally, of course, $\theta_0$ is equal to 30°, and $\varepsilon[k]$ is equal to 0°, in which case the offset compensation will be optimal, and the angular error will be smallest, but the offset and the angular error can also be reduced if samples are taken in the grey ranges of FIG. 18.

For completeness, it is noted that the angle θ is chosen to be equal to 0°, when the signal In2 reaches a positive peak, as illustrated in FIG. 5(a).

From the above, it can be understood that it suffices to position the target in only six discrete angular positions, as stated in step i) of the method 400. This positioning of the target may be a static positioning, e.g. using a stepper motor. In this case, it would be sufficient in the data-acquisition stage (meaning: step b) to take 6 data samples of each of the three baseband signals In0, In1, In2, hence 18 values in total, and performing the "post-processing" (meaning: step c and step d) using these 18 values. Alternatively, the positioning of the target may be dynamic, e.g. by constantly rotating the target while taking data samples, and storing only a subset of these data samples, for example only samples in the gray zones of FIG. 18, e.g. data samples nearest to the desired reference angles (i.e. near 30°, 90°, 150°, 210°, 270°, 330°). Interestingly, in both cases (static or dynamic), the uncompensated signals can be used to roughly estimate the angular position (typically within an accuracy of about +/−5°), which is more than accurate enough for taking data samples, which in turn can be used for determining the offset parameters, thus alleviating the need for an accurate external angular measurement reference. In other words, the method proposed herein does not require a highly accurate stepper motor, nor a motor with a very accurate angular speed.

Finally, it is noted that, depending on the implementation, most of the method steps, except the mechanical movement of the target, and optionally the excitation of the transmitter coil, can be performed on the sensor device itself. Alternatively, part of the method steps (such as the data acquisition and demodulation) are performed by the sensor device, and the post-processing would be done in an external computer, which would calculate the calibration values, and send them back to the sensor device for storage in the non-volatile memory 324.

The invention claimed is:

1. A method (400) of determining a set of calibration values (Aasym01, Aasym12, Aasym20) for offset-compensation of an inductive angular sensor arrangement (310) comprising: a substrate and a target; wherein the substrate comprises at least one transmitter coil (TX) and three receiver coils (Rx1, Rx2, Rx3) for generating three modulated signals from which three baseband signals (In0, In1, In2) which are electrically shifted relatively to one another by about 120° can be derived, and wherein the target is rotatable relative to said substrate; the method comprising the steps of:
   a) applying an alternating signal to the at least one transmitter coil (TX);
   b) performing at least six times, the steps i) to iv):
      i) positioning the target in one of six predefined angular positions (α30, α90, α150, α210, α270, α330) spaced apart by approximately 50° to 70°;
      ii) receiving a first, second and third alternating signal (S0, S1, S2) from the three receiver coils whilst the target is at or near said predefined angular position;
      iii) demodulating the first, second and third alternating signal (S0, S1, S2) thereby obtaining a first, second and third baseband signal (In0, In1, In2);
      iv) calculating a first, second and third pairwise difference signal (D01a, D12a, D20a) from the baseband signals, and storing the difference signals;
   c) initializing a first, second and third correction value (Aasym01, Aasym12, Aasym20);
   d) adjusting, at least once, the first, second and third pairwise difference signal (D01a, D12a, D20a) taking into account the first, second and third correction value (Aasym01, Aasym12, Aasym20), and adjusting at least once the first, second and third correction value (Aasym01, Aasym12, Aasym20) based on a sum of squares (SoS30, SoS90, SoS150, SoS210, SoS270, SoS330) of the adjusted pairwise difference signals.

2. The method of claim 1, wherein step d) further comprises:
   performing at least once, the steps v) to viii):
      v) subtracting the first, second and third correction value from the first, second, third pairwise difference signal (D01a, D12a, D20a) respectively, thereby obtaining corrected difference signals (D01, D12, D20);
      vi) determining a sum of squares (SoS30, SoS90, SoS150, SoS210, SoS270, SoS330) of the corrected difference signals for each of said six predefined angular positions;
      vii) estimating an amplitude (Arotor) of the corrected difference signals (D01, D12, D20);
      viii) updating the first, second and third correction value (Aasym01, Aasym12, Aasym20) based on the following formulas:

$$Aasym01 = (SoS90 - SoS270)/(6*Arotor);$$

$$Aasym12 = (SoS210 - SoS30)/(6*Arotor);$$

$$Aasym20 = (SoS330 - SoS150)/(6*Arotor).$$

3. The method according to claim 2, wherein Arotor is calculated in accordance with the following formula:

$$Arotor = [\max(D01) - \min(D01) + \max(D12) - \min(D12) + \max(D20) - \min(D20)]/6,$$

where max(·) means a maximum value, and min(·) means a minimum value.

4. The method according to claim 2,
   wherein step viii) further comprises: determining how much the correction values have changed in this iteration of step d), and comparing this change to a predefined threshold value;
   and if the change is larger than the threshold value, performing another iteration of step d);

and if the change is smaller than the threshold value, continuing with step e).

5. The method according to claim 1, wherein the sum of squares (SoS30, SoS90, SoS150, SoS210, SoS270, SoS330) is calculated in accordance with the following formula: SoS=(D01)$^2$+(D12)$^2$+(D20)$^2$.

6. The method according to claim 1, wherein step d) is performed a predefined number (N) of times, N being at least 3.

7. The method according to claim 1,
wherein step i) comprises: positioning the target in a stationary position; and
wherein step ii) comprises: receiving said alternating signals (S0, S1, S2) from the receiver coils whilst the target is in said predefined angular position.

8. The method according to claim 1,
wherein step i) comprises: allowing or causing the target to rotate; and
wherein step ii) comprises: receiving said alternating signals (S0, S1, S2) from the receiver coils whilst the target is in the vicinity of said predefined angular position.

9. The method according to claim 8, further comprising offset-compensation of said inductive angular sensor arrangement as part of a position sensor system (300) that further comprises an angular sensor device (320) having a non-volatile memory (324);
the method further comprising the steps of:
storing the calibration values (Aasym01, Aasym12, Aasym20) in the non-volatile memory (324) of the angular sensor device (320) during a calibration phase;
reading these calibration values from said non-volatile memory (324), and using them for offset-compensation during normal use of said angular sensor device (320).

10. The method according to claim 1,
wherein the at least one transmitter coil (TX) is substantially circular; and/or
wherein the at least one transmitter coil (TX) is part of an LC oscillator circuit.

11. The method according to claim 1, wherein the receiver coils are anti-winded.

12. The method according to claim 1, wherein the transmitter coil is excited with an alternating signal having a frequency in the range from 1 to 20 MHz.

13. An angular sensor device (320) comprising:
means for applying an alternating signal to the at least one transmitter coil (TX);
a demodulator circuit (323) configured for demodulating three modulated signals (S0, S1, S2) into three baseband signals (In0, In1, In2);
a non-volatile memory (324) for storing at least three calibration values (Aasym01, Aasym12, Aasym20);
a processing circuit (326) connected to an output of said demodulator circuit (323), and connected to said non-volatile memory (324), and configured for performing the following steps during a calibration phase:
performing at least six times:
  i) allowing or causing the target to rotate to position the target in one of six predefined angular positions (α30, α90, α150, α210, α270, α330) spaced apart by approximately 50° to 70°;
  ii) receiving a first, second and third alternating signal (S0, S1, S2) from the three receiver coils whilst the target is at or near said predefined angular position;
  iii) demodulating the first, second and third alternating signal (S0, S1, S2) thereby obtaining a first, second and third baseband signal (In0, In1, In2);
  iv) calculating a first, second and third pairwise difference signal (D0la, D12a, D20a) from the baseband signals, and storing the difference signals;
initializing a first, second and third correction value (Aasym01, Aasym12, Aasym20);
adjusting, at least once, the first, second and third pairwise difference signal (D01a, D12a, D20a) taking into account the first, second and third correction value (Aasym01, Aasym12, Aasym20), and adjusting at least once the first, second and third correction value (Aasym01, Aasym12, Aasym20) based on a sum of squares (SoS30, SoS90, SoS150, SoS210, SoS270, SoS330) of the adjusted pairwise difference signals; and
storing the calibration values (Aasym01, Aasym12, Aasym20) in the non-volatile memory (324) of the angular sensor device (320) during a calibration phase.

14. An angular sensor system (300) including the angular sensor device (320) according to claim 13 and comprising:
a substrate comprising at least one transmitter coil (TX) and three receiver coils (Rx1, Rx2, Rx3), configured for generating three modulated signals from which three baseband signals (In0, In1, In2) which are electrically shifted relatively to one another by about 120° can be derived;
a target (312) rotatable relative to said substrate;
the angular sensor device (320) connected to said at least one transmitter coil (TX) and to said receiver coils (Rx1, Rx2, Rx3).

15. The angular sensor system (300) according to claim 14, wherein the substrate has a rotational symmetry of 120° divided by the number (N) of lobes of the target.

* * * * *